Figure 1:
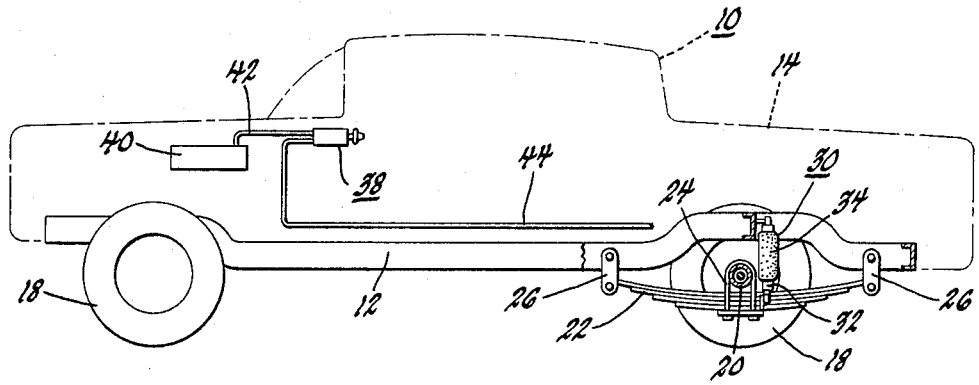

Nov. 15, 1966   J. F. PRIBONIC ETAL   3,285,281
PLURAL POSITION CONTROL VALVE WITH BUILT-IN RELIEF VALVE
Filed July 29, 1963                           2 Sheets-Sheet 1

INVENTORS
John F. Pribonic
George W. Jackson
BY
J.C. Evans
THEIR ATTORNEY

Nov. 15, 1966     J. F. PRIBONIC ETAL     3,285,281
PLURAL POSITION CONTROL VALVE WITH BUILT-IN RELIEF VALVE
Filed July 29, 1963     2 Sheets-Sheet 2
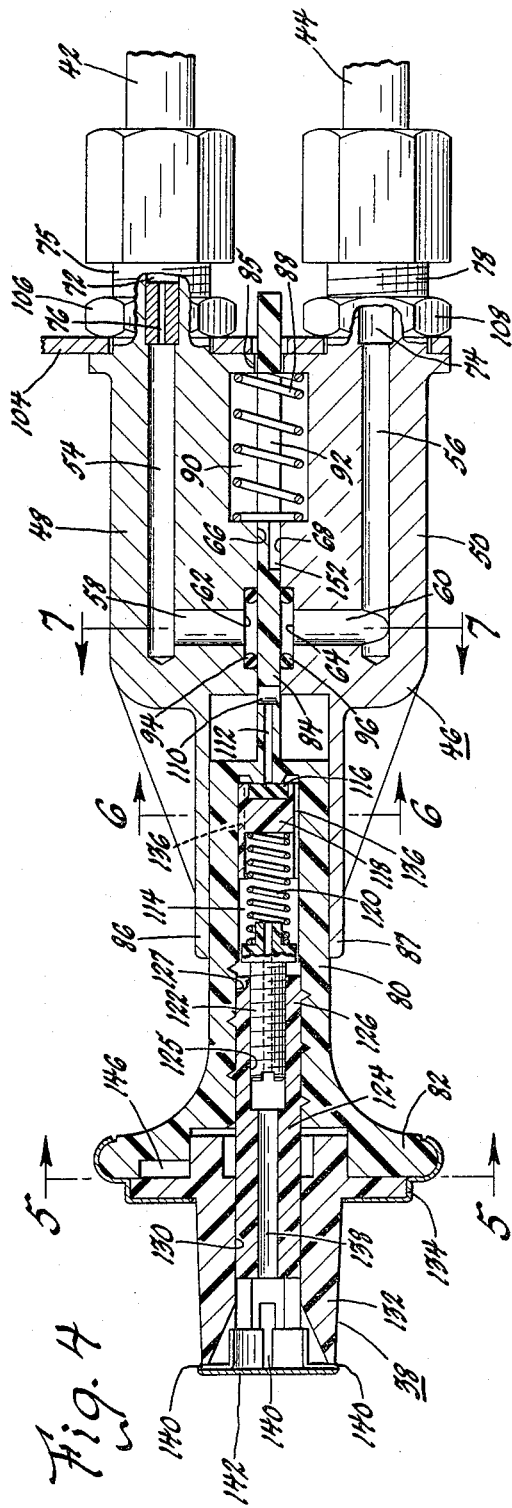
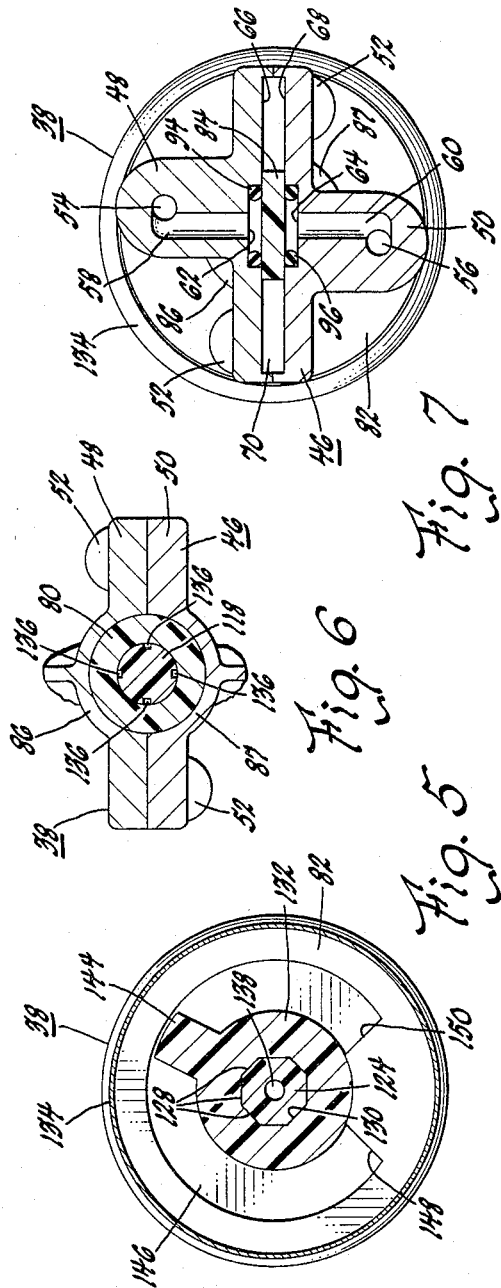
INVENTORS
John F. Pribonic
George W. Jackson
BY
J.C. Evans
THEIR ATTORNEY { # United States Patent Office 3,285,281
Patented Nov. 15, 1966

3,285,281
PLURAL POSITION CONTROL VALVE WITH BUILT-IN RELIEF VALVE
John F. Pribonic and George W. Jackson, Dayton, Ohio, assignors to General Motors Corporation, Detroit, Mich., a corporation of Delaware
Filed July 29, 1963, Ser. No. 298,310
4 Claims. (Cl. 137—596)

This invention relates to a fluid control valve for controlling fluid flow to a fluid actuatable device. More particularly, the invention relates to an improved fluid control valve for selectively operating inflatable air spring means so as to produce a variable supplimentary support of a sprung mass such as a vehicle chassis and body on an unsprung mass such as the road engaging wheels and axles of the vehicle.

It is an object of the present invention to provide a fluid control valve for regulating the supply of fluid under pressure to air spring means and exhaust of fluid under pressure from the air spring means including the provision of means therein to make the valve leak free to thereby prevent deflation of the air spring means during the force supplementing periods of operation thereof.

Further objects of the present invention are to improve fluid control valves for regulating the supply of fluid under pressure to air spring means and exhaust of fluid under pressure therefrom by the provision of means therein for preventing overinflation of the air spring means during the flow of fluid thereto with said overinflation control means being out of communication with the air spring means once it is inflated; and to improve such control valves by including presettable means therein for selectably controlling the inflation of the air spring means.

A further object of the present invention is to improve fluid control volves for regulating the supply of fluid under pressure to air spring means and the exhaust or fluid under pressure from the air spring means by the provision of a structurally simple valve body made of a minimum number of castings or parts that can be quickly assembled into a leak-free valve structure including means for selectively filling air spring means, maintaining the air spring means at a desired pressure following the fill period and means for exhausting the air spring means according to the desires of a particular user.

A further object of the present invention is to provide an improved fluid control valve for association with air spring means used between a sprung mass and an unsprung mass for supporting a portion of the weight of the sprung mass wherein said valve includes resilient means for urging a valving element into an equilibrium position where it blocks flow of pressurized fluid to and from the air spring means and actuator means for moving the valving element in opposition to the resilient means into a first unbalanced position wherein the air spring means is in communication with a source of pressurized fluid for inflating the air spring means and to a second unbalanced position wherein the air spring is communicated with atmosphere for exhausting pressurized fluid from the air spring.

Further objects and advantages of the present invention will be apparent from the following description, reference being had to the accompanying drawings wherein a preferred embodiment of the present invention is clearly shown.

Figure 2:
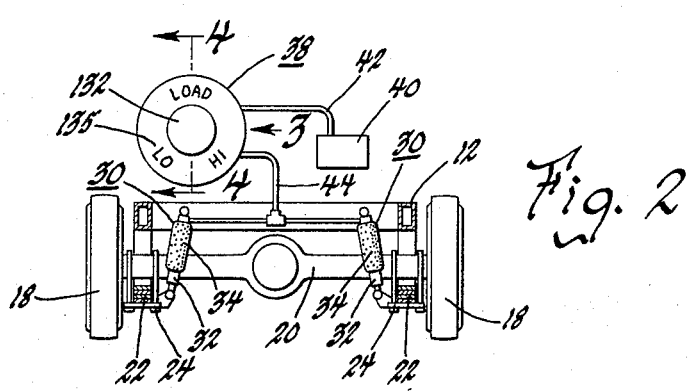
Figure 8:
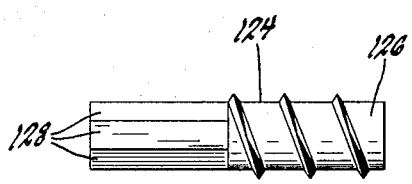
Figure 3:
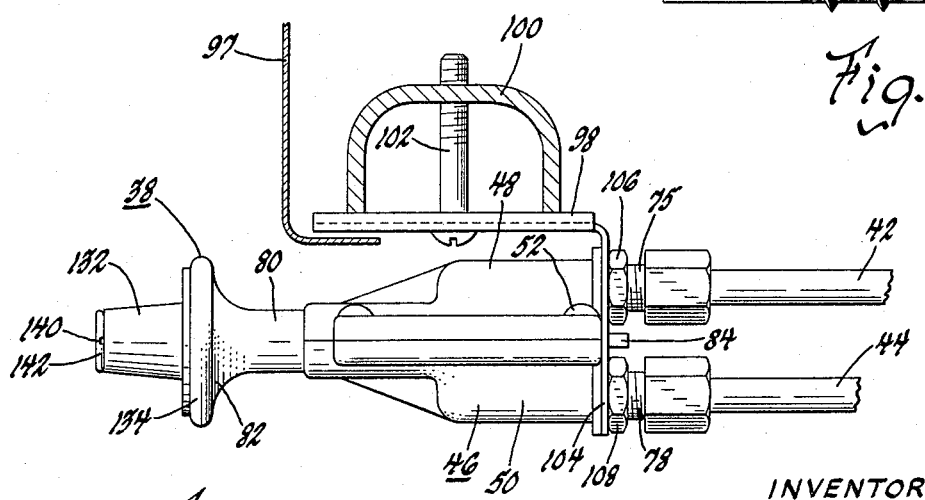

In the drawings:
FIGURE 1 is a somewhat schematic side elevational view showing an air lift suspension system using the fluid control valve of the present invention;
FIGURE 2 is an end elevational view of the suspension system of FIGURE 1;

FIGURE 3 is a view in side elevation of the fluid control valve of the present invention;
FIGURE 4 is an enlarged view in vertical section taken along the line 4—4 of FIGURE 2;
FIGURE 5 is a view in vertical section taken along the line 5—5 of FIGURE 4;
FIGURE 6 is a view in vertical section taken along the line 6—6 of FIGURE 4;
FIGURE 7 is a view in vertical section taken along the line 7—7 of FIGURE 4; and
FIGURE 8 is a view in side elevation of an adjuster element of the invention.

In FIGURES 1 and 2 of the drawings, a vehicle 10 is shown of the passenger type. The illustrated vehicle is merely representative of any vehicle having a sprung assembly supported upon an unsprung assembly. In the illustrated arrangement the vehicle 10 includes a sprung assembly comprising a chassis frame 12 and a body 14 supported thereon along with the conventional parts normally associated with such parts of a vehicle and wherein the unsprung assembly comprises ground engaging wheels 18 supported on an axle housing 20 in a conventional manner and the other parts normally associated therewith.

This spring assembly is supported upon the unsprung assembly by means of leaf springs 22, one being secured on the axle housing adjacent each end thereof by a spring seat and U-bolt arrangement 24 and shackle connections 26 located at either end of each of the leaf springs 22. In addition to the support of the unspring mass afforded by the leaf springs 22 which are merely illustrative examples of one suitable type of spring for suspending the sprung mass, a shock absorber and air spring auxiliary suspension unit 30 is provided adjacent each of the springs 22 for supplementing their supporting action in a desired manner. The combination shock absorber and air spring unit 30 is of the type illustrated in the patent to Schmitz et al. 3,042,392 issued July 3, 1962, and for purposes of understanding this invention, it is only necessary to point out that the auxiliary units 30 comprise a direct-acting hydraulic type shock absorber 32 having an air spring carried thereon that is an inflatable element 34 of a suitable resilient material that, when inflated, will supplement the load carrying capacity of the springs 22 so as to prevent excessive engagement of bump stops on the vehicle and undue elevation of the front end of the vehicle when an abnormal load is present in the sprung mass represented by the vehicle chassis 12 and body 14. Further details of the combination shock absorber and air spring suspension unit 30 are more particularly set forth in the above-mentioned patent which is herein incorporated by reference as an example of a device that might be controlled by the invention, it being understood that other fluid actuated devices might be equally well controlled by the invention.

The improved control valve 38 is located in FIGURES 1 and 2 in the general vicinity of a dashboard in vehicle 10 for quick access to the vehicle operator. He can thereby quickly control pressurized fluid flow from a suitable source of pressure 40 through a conduit 42 and thence to a conduit 44 into the inflatable elements 34 of the auxiliary suspension unit 30.

The improved fluid control valve 38 is more particularly set forth in FIGURES 3 through 8 as comprising a split housing 46 formed by similar first and second portions 48, 50 fastened together by suitable fastening means such as screws 52. Passageways 54, 56 are formed, respectively, in housing portions 48, 50 and directed axially thereof into intersecting fluid communication with passageways 58, 60, respectively, intercommunicating at recesses 62, 64 located in flat inner surface portions 66, 68 on the housing portions 48, 50, respectively. The housing 46 has a chamber 70 located centrally therein formed by the flat surfaces 66, 68 of portions 48, 50 and the side walls thereof.

In the illustrated arrangement the passageway 54 communicates with an inlet port 72 formed by a threaded fitting element 75 adapted to be connected to the conduit 42 communicating with the pressurized source of fluid 40 illustrated in FIGURES 1 and 2 so that pressurized fluid passes therefrom into the valve body 46 through a restriction orifice 76 supported within the inlet port 72 for limiting the flow of pressurized fluid through the passageways 54, 58. The passageways 56, 60 likewise communicate with an outlet port 74 formed by a threaded fluid flow fitting 78 formed integrally as a part of the body portion 50. The fitting 78 is adapted to be connected to a conduit such as that illustrated at 44 in FIGURE 2 for directing pressurized fluid flow to and from an air spring or inflatable element such as that illustrated at 34.

Fluid flow from the inlet port 72 to the outlet port 74 is selectively controlled by means of an elongated tubular push-pull actuator 80 having a handle portion 82 connected on one end thereof and having the opposite end thereof connected to a slide valve element 84 representatively illustrated as being of a substantially elongated and flattened configuration that is slidably received in the opening 70 and directed through an exhaust opening 85 in the end housing 46. The valve element 84 is positioned relative to housing 46 by a sliding engagement of the opposite end of actuator 80 with the inner surface of extensions 86, 87 on each of the housing portions 48, 50, respectively.

A coil spring element 88 disposed in an enlarged portion 90 of the opening 70 that communicates with opening 85 in housing 48 is located within a rectangular opening 92 in the slide valve element 84 so that the opposite ends thereof engage the inner surfaces on the housing portions 48, 50 when the slide valve 84 is in an equilibrium position within housing 46.

When the slide valve element 84 is in its equilibrium position it blocks flow of fluid between the inlet port 72, outlet port 74 and exhaust port 85 because of the sealing engagement therewith of O-ring sealing elements 94, 96 seated respectively in the recesses 62, 64 in the body portions 48, 50 as best illustrated in FIGURES 4 and 7. These two O-ring elements 94, 96, in accordance with certain of the concepts of this invention, serve as the sole sealing means in the valve structure and it has been found that their arrangement in the valve causes it to be substantially leak proof.

In the illustrated embodiment the valve housing 46 is located adjacent a dashboard or instrument panel 97 of a vehicle by means representatively shown as including a bracket 98 and a U-shaped retainer 100 fastened on either side of a fixed support to be held thereagainst by means of a screw 102 threadably engaged the U-shaped retainer 100. An arm portion 104 of bracket 98 is secured to one end of the valve body 46 by suitable fastening means, for example nuts 106, 108, threaded on the fluid fittings 75, 78 against the arm 104 for rigidly securing the valve housing 46 relative to panel 97.

By virtue of the above-described structure, when the vehicle operator wishes to supplement the supporting action of the main springs 22 of the vehicle, the tubular actuator 80 is pushed inwardly of the housing 46 against the biasing action of the spring 88 to a first unbalanced position wherein an aperture 110 directed through the flat slide valve element 84 is located in alignment with the fluid flow passageways 58, 60 to thereby allow pressurized fluid flow to pass from source 40, conduit 42, the inlet port 72, through passageway 54, passageway 58, the opening 110, passageway 60, passageway 56 to the outlet port 74, through conduit 44 and thence into the inflatable air spring element 34 which will expand in a predetermined manner to carry a portion of the weight of the unsprung mass of the vehicle associated therewith.

Another feature of the present invention is that when the tubular actuator element 80 is pushed inwardly of the valve housing 46 so that the opening 110 through the slide valve element 84 communicates the inlet and outlet ports 72, 74, a pressure control mechanism is moved into communication with the fluid network for inflating the air spring apparatus with the pressure control mechanism maintaining the pressure in the air spring mechanism at a predetermined pressure to thereby maintain a desired relationship between the unsprung and sprung masses being controlled thereby. More particularly, when the opening 110 is located in alignment with the passageways 58, 60 a passageway 112 formed axially of the slide valve element 84 communicates the opening 110 with an interior chamber 114 in the tubular actuator element 80. Within the chamber 114 a sealing element 116 is supported in a recess on one end of a plunger element 118 slidably supported within the tubular actuator housing 80 so that the sealing element 116 will be held in sealing engagement with a seat surrounding the passageway 112 at chamber 114 through the biasing action of a spring 120 having one end thereof in axial abutment with the opposite end of the plunger 118 and a radially outwardly directed flange on one end of a tubular insert 122. The opposite end of insert 122 is supported by an adjuster element 124 by being threadably engaged within a threaded opening 125 therein. The adjuster element 124 has a threaded end 126 thereof received by an internally threaded portion 127 of actuator housing 80 and another end portion with a plurality of flat faces 128 slidably supported within an opening 130 in a rotatable knob 132.

In the illustrated embodiment the knob 132 is fastened to the handle 82 against axial movement relative thereto by means of a spring retainer 134 having one surface thereof overlying one front face on the knob 132 and outer periphery thereof bent over the outer periphery of the knob 82. The knob 132 has a suitable scale thereon at 135 to indicate the load carrying capacity of the air spring mechanism associated with the fluid control valve as reflected by the pressure buildup therein when the actuator element is pushed inwardly of housing 46. In order to adjust the air spring support the knob 132 is rotated relative to handle 82 to cause the adjuster element 124 to move relative to the tubular actuator housing 80 by the interaction of the inner surfaces in knob 132 with the flat faces 128 on element 124 to thereby vary the axial position of the tubular insert 122 within chamber 114. This varies the biasing action of spring 120 to thereby vary the pressure at which sealing element 116 will open whereby pressure is maintained in the air spring mechanism at a desired preselected level by bleeding excess pressure from outlet port 74, passageways 56, 60, opening 110, passageway 112, through passageways 136 formed in the outer periphery of plunger element 118 and into chamber 114. From chamber 114 fluid passes to atmosphere through the tubular insert 122, an axial opening 138 through the adjuster element 124, opening 130 in knob 132 and thence through openings 140 in a cover 142 on the end of knob 132.

In the illustrated arrangement the axial positioning of the tubular insert 122 within chamber 114 is limited by a radially outwardly directed arm 144 on knob 132 that is received by an opening 146 within handle 82 for movement into engagement with internal surfaces 148, 150 at spaced locations within handle 82. The knob 132 and adjuster element 124 thereby serve as the primary means for adjusting the pressure to which the air spring element will be inflated and fine adjustment is obtained by threadably adjusting insert 122 within adjuster element 124.

One feature of the above-described presettable pressure control arrangement is that it does not communicate with the air spring following inflation thereof since the spring 88 will locate slide valve element 84 in its equilibrium position where passageway 112 is sealed off from passageway 60 by O-ring seals 94, 96. Hence, transitory pressure increases in the air spring due to shock loading thereof cannot pop the sealing element 116 to cause deflation of the air spring when it is supplementing the springs 22.

When it is desired to deflate the air spring mechanism, the control actuator 80 is pulled outwardly of the housing 46 against the biasing action of the spring 88 into a second unbalanced position where a passageway 152 on one face of the valve element 84 adjacent the outboard end thereof is aligned with the passageway 60 to thereby allow pressurized fluid within the air spring mechanism to pass therefrom through conduit 44, the outlet port 74, passageway 56, passageway 60 and thence through the passageway 152 into the opening 90 in the valve body 46 and out the end thereof through the opening 85. Once the air lift spring mechanism has been deflated, the actuator 80 is released and the spring 88 will return the slide valve 84 to its equilibrium position.

While the embodiment of the present invention as herein disclosed constitutes a preferred form, it is to be understood that other forms might be adopted.

What is claimed is as follows:

1. In a fluid control valve, body means including first and second housing portions having an interface, said first and second housing portions forming an inlet passageway and an outlet passageway respectively, said inlet passageway and said outlet passageway intercommunicating at a common connection, said housing portions forming an exhaust passageway at the interface thereof, a slide valve element supported by said housing portions for reciprocable movement relative thereto, seal means supported by said housing portions in sealing engagement with opposite sides of said valve element, resilient means urging said slide valve element into an equilibrium position within said housing portions where it cooperates with said seal means to block fluid flow through said passageways and fluid leakage outwardly of said body means, an actuator element supported by said housing portions for reciprocation relative thereto operatively associated with said slide valve element for moving it into first and second unbalanced positions in opposition to said resilient means, said slide valve element including means for communicating said inlet and outlet passageways therein for inflow of pressurized fluid from said inlet passageway through said outlet passageway and means for communicating said outlet passageway and said exhaust passageway for outflow of pressurized fluid from said outlet passageway through said exhaust passageway upon movement thereof into said first and second unbalanced portions respectively.

2. In a fluid control valve, body means including first and second housing portions having an interface, said first and second housing portions forming an inlet passageway and an outlet passageway respectively, said inlet passageway and said outlet passageway intercommunicating at a common connection, said housing portions forming an exhaust passageway at the interface thereof, a slide valve element supported by said housing portions for reciprocable movement relative thereto, seal means supported by said housing portions in sealing engagement with opposite sides of said valve element, means including a spring supported within said housing portions for urging said slide valve element into an equilibrium position where it cooperates with said seal means to block fluid flow through said passageways and fluid leakage outwardly of said body means, a tubular actuator element supported by said housing portions for reciprocation relative thereto operatively associated with said slide valve element for moving it into first and second unbalanced positions in opposition to said spring, said slide valve element including means for communicating said inlet and outlet passageways therein for inflow of pressurized fluid from said inlet passageway through said outlet passageway and means for communicating said outlet passageway and said exhaust passageway for outflow of pressurized fluid from said outlet passageway through said exhaust passageway upon movement thereof into said first and second unbalanced positions respectively, pressure control means supported within said tubular actuator element, means for communicating said pressure control means with said inlet and outlet passageways when said slide valve element is in its first unbalanced position for controlling the pressure in said passageways, said pressure control means being located out of communication with said passageways when said slide valve is in its equilibrium position.

3. In a fluid control valve, body means including first and second housing portions having an interface, said first and second housing portions forming an inlet passageway and an outlet passageway respectively, said inlet passageway and said outlet passageway intercommunicating at a common connection, said housing portions forming an exhaust passageway at the interface thereof, a slide valve element supported by said housing portions for reciprocable movement relative thereto, seal means supported by said housing portions in sealing engagement with opposite sides of said valve element, means including a spring supported within said housing portions for urging said slide valve element into an equilibrium position where it cooperates with said seal means to block fluid flow through said passageways and fluid leakage outwardly of said body means, a tubular actuator element supported by said housing portions for reciprocation relative thereto operatively associated with said slide valve element for moving it into first and second unbalanced positions in opposition to said spring, said slide valve element including means for communicating said inlet and outlet passageways therein for inflow of pressurized fluid from said inlet passageway through said outlet passageway and means for communicating said outlet passageway and said exhaust passageway for outflow of pressurized fluid from said outlet passageway through said exhaust passageway upon movement thereof into said first and second unbalanced positions respectively, means supported by said reciprocable actuator element for controlling the pressure in said first and second passageways when said fluid control element is in said first unbalanced position, said pressure control means being located out of communication with said first and second passageways when said fluid control element is in its equilibrium position, and means for modulating the controlling effect of said pressure control means including a presettable manually adjustable element.

4. In a fluid control valve, body means forming first, second and third passageways in interflow communication, a fluid control element supported by said body means for movement relative thereto including means for blocking fluid flow through said passageways, resilient means urging said fluid control element into an equilibrium position within said body means for blocking fluid flow through said passageways, a tubular actuator element supported by said body means for movement relative thereto, said actuator element being operatively associated with said fluid control element for moving said fluid control element into first and second unbalanced positions in opposition to said resilient means, said fluid control element including a first control passageway therein for communicating said first and second body means passageways for inflow of pressurized fluid from said first passageway to said second passageway when said element is in its first unbalanced position and including a second control passageway therein fluidly separated from said first control passageway for communicating said second and third body means passageways for allowing outflow of pressurized fluid from said second passageway to said third passageway when said control element is in its second unbalanced position, pressure relief means supported within said tubular actuator element, said pressure relief means including an inlet port communicating with said first control passageway and an outlet communicating with the interior of said tubular actuator element, said actuator element positioning said first control passageway in said fluid control element in communication with said first and second body means passageways for controlling the pressure in said first and second body means passageways when said fluid control element is in said first unbalanced position, said first control passageway in said control element being located out of communication with said first and second body means passageways when said fluid control element is in its equilibrium position, and means for modulating the controlling effect of said pressure relief means including a presettable manually adjustable element, said manually adjustable element including an exhaust passageway therethrough in communication with the interior of said tubular actuator element and through which fluid passes to a point exteriorly of said body means when a predetermined pressure is present in said first and second body means passageways to indicate the attainment of such a predetermined pressure therein when said control element is in its first unbalanced position.

References Cited by the Examiner

UNITED STATES PATENTS

| | | | |
|---|---|---|---|
| 2,094,926 | 10/1937 | Nutter et al. | 137—625.25 X |
| 2,200,396 | 5/1940 | Martin | 137—625.25 X |
| 2,594,664 | 4/1952 | Livers et al. | 137—625.25 X |
| 2,859,031 | 11/1958 | Hansen et al. | 137—524 X |

WILLIAM F. O'DEA, *Primary Examiner.*

ISADOR WEIL, *Examiner.*

D. ZOBKIW, *Assistant Examiner.*